June 17, 1941.  F. H. LESLIE  2,246,051
STAINLESS CLAD SINK
Filed Feb. 9, 1939  2 Sheets-Sheet 1
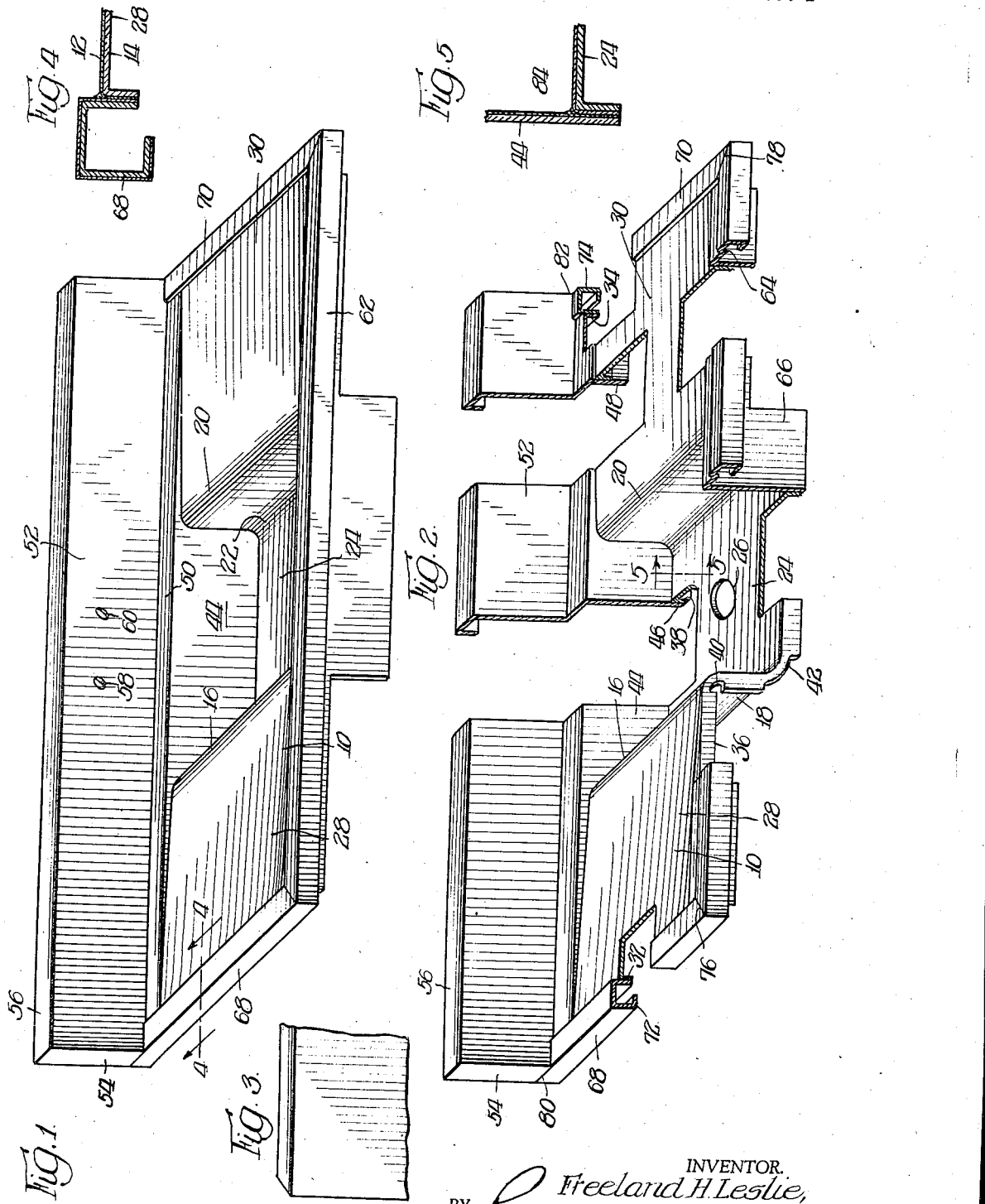
INVENTOR.
Freeland H. Leslie,
BY
ATTORNEY.

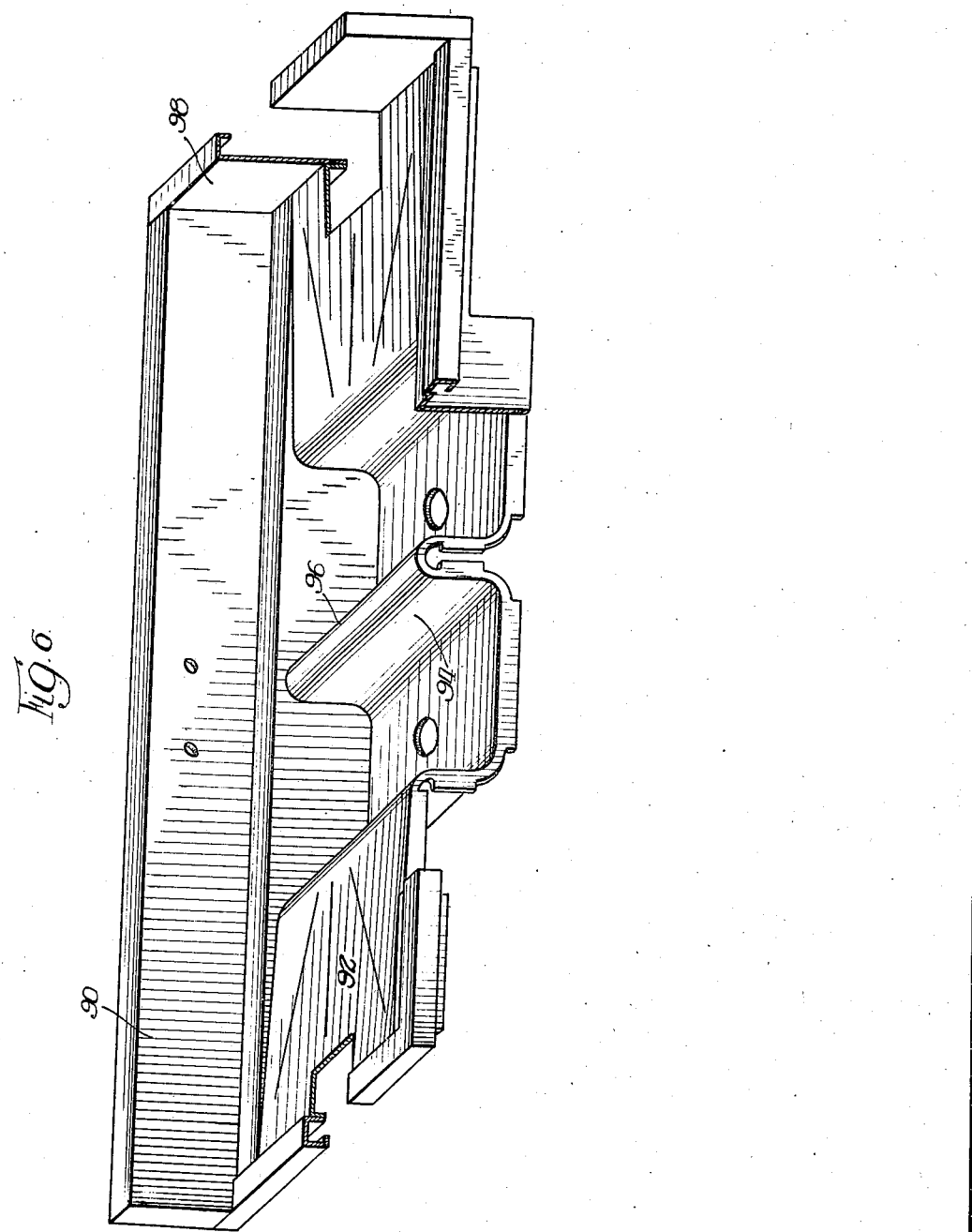

Patented June 17, 1941

2,246,051

UNITED STATES PATENT OFFICE 2,246,051

STAINLESS CLAD SINK

Freeland H. Leslie, Chicago, Ill.

Application February 9, 1939, Serial No. 255,362

17 Claims. (Cl. 4—187)

This invention relates to sinks made of stainless clad steel and to a method of fabricating the same.

During the past decade the stainless steel sink has become increasingly popular. It is superior to porcelain sinks in appearance and ease of cleaning and can withstand far more ill treatment than can the porcelain sink. It cannot be chipped and is difficult to scratch. Compared to other metals, such as nickel-steel alloys, it excels in durability and resistance to scratching.

The sales of the solid stainless steel sink, however, are but a fraction of the sales of porcelain sinks because of price. The high factory price of a stainless steel sink is attributable, firstly, to the cost of the metal, and, secondly, to the expense of fabrication. The mill price of solid stainless is some ten times the price of ordinary steel. For fabrication purposes, stainless is difficult to draw, anneal, weld or grind and polish after welding. In making the bowl of the ordinary stainless sink it is frequently necessary to draw the bowl part way and then anneal it before drawing it further. This is necessary because stainless steel exhibits the peculiar property of becoming brittle with drawing or excessive rolling. Annealing restores the molecular and grain relationship of the steel particles which had been distorted into an unstable condition by the drawing or rolling. It is apparent that a process which involves a series of drawing, annealing, welding and grinding steps must be very expensive.

A result incident to the polishing after annealing or welding of the stainless is the removal of the polish grain placed in the stainless surface by the polishing machines of the mill. When polished stainless steel leaves the mill, it has a bright surface showing short streaks in parallel, much like the grain of wood. This grain is very attractive. Under present methods of fabricating stainless sinks, however, much of this grain is removed. When the bowl comes out of the annealing furnace, it is black and covered with oxide scale. Special grinding removes this, but the finished product has no grain. On the contrary the fine lines left by grinding run in many directions and the bowl is not nearly as attractive as if it had retained the original grained finish of the stainless.

Within the last few years the steel companies have been offering a stainless clad material which is composed of a layer of stainless fused to a layer of mild steel. In cross section, the thickness of the stainless varies from twenty percent (20%) to thirty percent (30%) of the entire thickness of the sheet. The cost of stainless clad is approximately one half that of solid stainless. The industry concedes that there are many applications where a stainless clad is as good as a solid stainless, and sinks constitute such an application, for the back and bottom of a sink may be adequately protected by paint. Only the upper used face need be made of stainless.

My first attempts to fabricate a stainless clad sink followed conventional methods of solid stainless fabrication. These methods involve a serious grinding problem. When the bowl of a solid stainless sink is welded to the sideboards, the scar left by the welding must be removed by grinding. Sometimes the scar destroys the appearance of the metal for a considerable depth. Where this occurs on stainless clad the grinding may penetrate the stainless and expose the mild steel. This is a very common occurrence, and when it occurs it is necessary to discard the entire sink. The loss on one spoiled sink will absorb the profit on a great number of perfect sinks.

The general object of this invention is to provide a stainless clad sink which will surpass in appearance and equal in durability sinks made of solid stainless steel.

Another object of this invention is to avoid polishing the stainless in order that the mill impressed grain will not be removed but will appear untouched on the finished sink.

A specific object of this invention is to fabricate a sink out of sheets of stainless clad without drawing or annealing the sheets.

Another object of this invention is to provide metal skirts on units of the sinks so that no weld can be seen from the top or sides of the completed sink.

A further object is to face stainless clad to stainless clad at all joints for the purpose of preventing exposure of the mild steel to the effects of corrosion and rust during use.

Then too I wish to employ pleasing curve lines which prevail in the porcelain sink art, but which are not generally used in solid stainless sinks because additional drawing is necessary in order to flatten the comparatively sharp edge necessitated by the first drawing steps.

These and such other objects as may hereinafter appear are attained in my invention described below and shown in the drawings comprising two sheets in which:

Figure 1 is a perspective view of a one bowl sink;

Figure 2 is a view partly in perspective and partly in cross section of the sink shown in Figure 1;

Figure 3 is a view in elevation of a fragment of a front skirt for a sink;

Figure 4 is a sectional view taken on line 4—4 of Figure 1;

Figure 5 is a sectional view taken on line 5—5 of Figure 2; and

Figure 6 is a view partly in perspective and partly in cross section of a double bowl sink.

With the drawings in view, 10 is a sheet of stainless steel clad metal comprising stainless sheet 12 fused to mild steel 14 and is bent at 16, 18, 20 and 22 to form bowl 24. This sheet of stainless steel clad metal 10 may be generally referred to as the bed of the sink and it forms the bottom and two side walls of the bowl and an adjoining drain board or drain boards and constitutes the center member about which a sink fabricated according to the teachings of this invention is built. Centrally of bowl 24 is hole 26. Attention is called to bends 16, 18, 20 and 22 which are on a radius in excess of ¾ of an inch. These curves are very desirable in sink structure because they assist in draining from the boards 28 and 30 and are generally used in cast porcelain sinks.

The plate 10 is flanged downwardly around its entire periphery by flanges 32, 34, 36 and 38. The back flange 38 and the front flange 36 are scalloped as at 40 and 42 to assist in the bending operation, but it will be noted that the portions 40 and 42 form part of the continuous flange along the front edge of the sink bed and it is necessary to place spot welds at these curving points of the flange in order to bind firmly the front and back walls to the bowl at the curved portions so as to provide the necessary strength at these points during the life of the sink. While the crevices are filled with solder, the latter serves only as a filler to prevent leakage and does not strengthen the union between the front and back walls of the bowl and the sink bed.

The back wall of the sink fabricated from a single piece of metal consists of back wall 44 adapted to overhang the sheet 10 as at 46 and 48 to engage the back flange 38, and is bent to form ledge 50 and splash board 52. Finishing shoulders, as 54 and 56, complete this unit and the splash board 52 is perforated at 58 and 60 to receive the faucet fixtures.

The front of the sink is generally identified as 62 and comprises the shaped edge 64, a cross section of which may be seen in Figure 2, and the long depending flange of uneven configuration 66, which is adapted to engage the front flange 36 of the plate 10.

The side pieces 68 and 70 have a cross section indicated at 72 and 74 and are adapted to engage the flanges 32 and 34 respectively.

In constructing any sink, the five units comprising the finished sink, namely 10, 44, 62, 68 and 70, are first sheared and shaped to their finished form. The back 44 is then spot welded to the flange 38. The front 62 is spot welded to the flange 36, the side 68 to the flange 32 and the side 70 to the flange 34. The spot welds are about two inches apart. The mitre joints 76 and 78 are welded or soldered and the same is true of the joints 80 and 82.

The process of making tight the joints around the edge of the plate 10 is indicated in Figures 4 and 5. Attention is called first to the fact that the stainless clad always faces the stainless clad. Solder 84 is flowed into the crack and is finished by a shaping tool. A very perfect joint is effected and it is almost impossible for the ordinary person to detect the joint. No matter how much the solder should wear in use, it would not be possible for the mild steel to be exposed to corrosion.

In Figure 5 there appears my double stainless steel sink generally identified by the numeral 90. The bed 92 is formed according to the same principles discussed relative to the bed 10 excepting that a dividing wall 94 is formed in plate 92. A simple shaping operation creates two bowls in place of one. The one side wall 96 constitutes a side splash board in place of the low side 70 shown in Figures 1 and 2.

Attention is called to the fact that no exposed part of the sink shows a weld or grinding. The rolling mill grain finish has not been impaired. This is one of the important new results obtained by my structure and method of fabrication.

Generally speaking, my sinks are mounted in cabinets so that the visible limits of the sink are the back splash board 52 and the edge molding of the front 62 and sides 68 and 70. However, my construction lends itself quite readily to the form common with porcelain sinks, that is, a clear space between the sink and the floor. Where this form is used, a concealing skirt depending from the front side, see Figure 3, is used.

It is apparent that other configurations of the base plate 10 or 92 may be evolved without departing from the spirit of this invention. For example it is quite possible to prepare a conventional sink having a drainboard on just one side. It is further possible to prepare commercial sinks having several bowls side by side and some sinks with a double series of bowls. The essential features of the invention consisting of the shaping of a stainless steel clad plate will not be departed from. These and other modifications and alterations may be made in the illustrated form of the invention without departing from the true scope thereof as set forth in the appended claims.

Having thus described the invention, what I claim as new and desire to secure by Letters Patent of the United States, is:

1. An assembled sink built up of a plurality of members comprising, a bed member of sheet metal forming a bottom and two opposite side walls of a bowl and integral therewith as an extension of one of said side walls a drain board, a front wall member for said bowl, a back wall member for said bowl, and means joining the front and back wall members to the bed member to form a drain board sink.

2. An assembled sink built up of a plurality of members comprising, a bed member of sheet metal forming a bottom and two opposite side walls of a bowl and integral therewith as an extension of each of said side walls a drain board, a front wall member for said bowl, a back wall member for said bowl, and means for joining the front and back wall members to the bed member to form a drain board sink.

3. An assembled sink built up of a plurality of members comprising, a bed member of sheet metal forming a bottom and two opposite side walls of a bowl and integral therewith as an extension of one of said side walls a drain board and integral therewith as an extension of the other side wall of the bowl, a side wall, bottom and opposite side walls of a second bowl, a front wall member for said bowls, a back wall member for said bowls, and means for joining the front and back wall members to the bed member to form a double bowl drain board sink.

4. An assembled sink built up of a plurality of members comprising, a bed member of sheet metal forming a bottom and two opposite side walls of a bowl and integral therewith as an extension of one of said side walls a drain board, a front wall member for said bowl, a back wall member for said bowl, and means joining the front and back wall members to the bed member to form a drain board sink, said means comprising continuous, downwardly directed flanges along the front and rear edges of the bed member and means for fastening the front and back wall members to said continuous flanges.

5. An assembled sink built up of a plurality of members comprising, a bed member of sheet metal forming a bottom and two opposite side walls of a bowl and integral therewith as an extension of one of said side walls a drain board, a front wall member for said bowl, a back wall member for said bowl, and means joining the front and back wall members to the bed member to form a drain board sink, said means comprising continuous, downwardly directed flanges along the front and rear edges of the bed member characterized by shallow cut-out portions in said flanges at points adjacent to curving portions of the bed member, and means for fastening the front and back wall members to said continuous flanges.

6. An assembled sink built up of a plurality of members comprising, a bed member of sheet metal forming a bottom and two opposite side walls of a bowl and integral therewith as an extension of each of said side walls a drain board, a front wall member for said bowl, a back wall member for said bowl, and means joining the front and back wall members to the bed member to form a drain board sink, said means comprising continuous, downwardly directed flanges along the front and rear edges of the bed member and means for fastening the front and back wall members to said continuous flanges.

7. An assembled sink built up of a plurality of members comprising, a bed member of sheet metal forming a bottom and two opposite side walls of a bowl and integral therewith as an extension of one of said side walls a drain board and integral therewith as an extension of the other side wall of the bowl, a side wall, bottom and opposite side walls of a second bowl, a front wall member for said bowls, a back wall member for said bowls, and means for joining the front and back wall members to the bed member to form a double bowl drain board sink, said means comprising continuous, downwardly directed flanges along the front and rear edges of the bed member and means for fastening the front and back wall members to said continuous flanges.

8. An assembled sink built up of a plurality of members comprising, a bed member of sheet metal forming a bottom and two opposite side walls of a bowl and integral therewith as an extension of one of said side walls a drain board, a continuous, downwardly directed flange along each edge of said bed member, a front wall member, a back wall member, and side trim members, and means joining said front, back and side trim members to the associated flange to form a drain board sink.

9. An assembled sink built up of a plurality of members comprising, a bed member of sheet metal forming a bottom and two opposite side walls of a bowl and integral therewith as an extension of one of said side walls a drain board, a continuous, downwardly directed flange along each edge of said bed member, a front wall member, a back wall member, and means joining said front and back wall members to the bed member to form a sink, said front wall member being characterized by a wall for engaging the associated continuous flange along the front edge of the bed member and having an outwardly directed apron depending to a point below that portion of the wall which engages the flange whereby any means for effecting a joint between the flange and the wall member will be concealed.

10. An assembled sink built up of a plurality of members comprising, a bed member of stainless clad sheet steel with the stainless steel turned uppermost forming a bottom and two opposite side walls of a bowl and integral therewith as an extension of one of said side walls a drain board, downwardly directed flanges around the periphery of said bed member, and front and back members and side trim members, and welds joining said front, back and side trim members to associated downwardly directed flanges on the integral bed member, said front member and side trim members being characterized by outwardly directed aprons depending to a point below that portion of the respective front or side trim members which contains the weld to the flange whereby any means for effecting a joint between the flange and the wall member will be concealed.

11. The method of making an assembled sink which comprises the steps of bending a strip of sheet metal to form a transverse open ended trough and an integral drain board at one side thereof, and of assembling said trough and integral drain board between front and back wall members to form a drain board sink.

12. The method of making an assembled sink which comprises the steps of bending a substantially rectangular sheet of metal downwardly at right angles to its length and at a distance from one end sufficient to form an inclined drain board of selected length, of shaping the bent down portion to form a side wall, bottom and opposite side wall of a bowl, of affixing to the front edge of the shaped rectangular sheet a front wall member, and of affixing to the rear edge of the shaped rectangular sheet a rear wall member.

13. An assembled sink built up of a plurality of members comprising a bed member of stainless clad sheet metal having the stainless surface uppermost, said bed member being bent to form a drainboard and the adjacent side wall bottom and opposite side wall of a bowl, a front wall member for said bowl, a back wall member for said bowl, and means for joining the front and back wall members to the bed member at points outside the exposed surfaces of the finished sink.

14. The method of fabricating a sink which comprises making transverse bends in a rectangular sheet of metal to form the drainboard adjacent and opposite side wall and bottom of a bowl, forming separate front and back wall members from sheet metal, and affixing said front and side wall members to the first member so as to form a bowl of a drainboard sink.

15. The method of making a sink which comprises the step of flanging downwardly the long sides of a rectangular sheet of metal, making transverse bends in the rectangular sheet of metal so as to form the drainboard adjacent and opposite side walls and bottom of a bowl, separately forming front and back wall members for the bowl, and attaching said front and back wall members of the bowl to the flanges of the first formed member.

16. The method of making a sink which comprises disposing a substantially rectangular sheet of stainless clad sheet metal with the stainless surface uppermost, flanging downwardly the long sides of said sheet, separately forming from sheet metal front and back wall members for a bowl, and fabricating the several members into a drainboard sink by attaching the front and back members to the flanges on the first member formed in the first step.

17. An assembled sink comprising a bed member forming the drainboard adjacent and opposite side walls and bottom of a drainboard sink and having a flange along each of its front and back edges, a front wall member having along its upper edge an inverted U-shaped member and being attached to the front flange of the bed member so as to provide a double support for the sink, and a rear wall member mounted on the rear flange of the bed member.

FREELAND H. LESLIE.